March 13, 1962  J. FOSSA  3,024,481
UPPER UNLOADING AND STACKING DEVICE
Filed Dec. 28, 1959  8 Sheets-Sheet 1

*Fig. 1*

*Inventor*
Joseph Fossa
By his Attorney

March 13, 1962  J. FOSSA  3,024,481
UPPER UNLOADING AND STACKING DEVICE
Filed Dec. 28, 1959  8 Sheets-Sheet 4

J. FOSSA 3,024,481

UPPER UNLOADING AND STACKING DEVICE

Filed Dec. 28, 1959

March 13, 1962  J. FOSSA  3,024,481
UPPER UNLOADING AND STACKING DEVICE
Filed Dec. 28, 1959  8 Sheets-Sheet 6

Fig. 9

United States Patent Office 3,024,481
Patented Mar. 13, 1962

3,024,481
UPPER UNLOADING AND STACKING DEVICE
Joseph Fossa, South Hamilton, Mass., assignor to United Shoe Machinery Corporation, Boston, Mass., a corporation of New Jersey
Filed Dec. 28, 1959, Ser. No. 862,142
11 Claims. (Cl. 12—1)

The present invention relates to a machine for operating upon shoe uppers and more particularly to an upper unloading and stacking device.

The invention is herein disclosed as embodied in a machine for automatically eyeletting and lacing the eyeletted upper of the general type shown in Fossa Pat. No. 2,872,691 dated February 10, 1959, and in Fossa Pat. No. 2,461,889 dated February 15, 1949.

It is a principal object of the present invention to provide an improved upper unloading and stacking device which is particularly adapted for removing from the machine each successively processed upper and for stacking these uppers.

More specifically it is an object of the invention to provide an unloading device which is well adapted for automatic operation in a machine having a work support on which the upper is transferred from an operating station to a discharge station to remove the processed upper and to position same in a stack.

With these and other objects in view as may hereinafter appear, the several features of the invention consist in the devices, combinations and arrangement of parts hereinafter described and claimed, which together with the advantages to be obtained thereby will be readily understood by one skilled in the art from the following description taken in connection with the accompanying drawings, in which:

FIGS. 11–14 illustrate an alternative form of the invention in which a hook member is adapted to engage the lacings of the processed upper and to draw said upper away from the machine to its stacking position of which;

Figure 1:
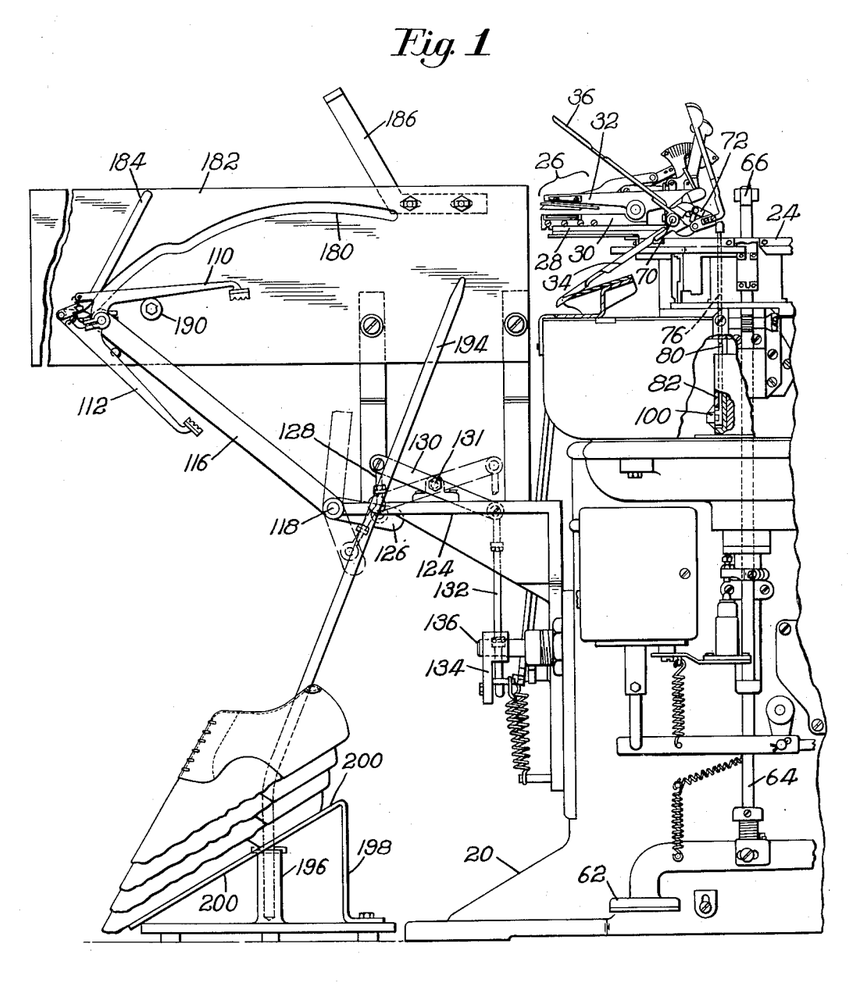
FIG. 1 is a somewhat fragmentary view in side elevation of a portion of the base of my automatic shoe upper eyeletting and lacing machine and illustrating particularly the unloading device associated with the fourth or discharge station of the rotatable work supporting turret.
Figure 2:
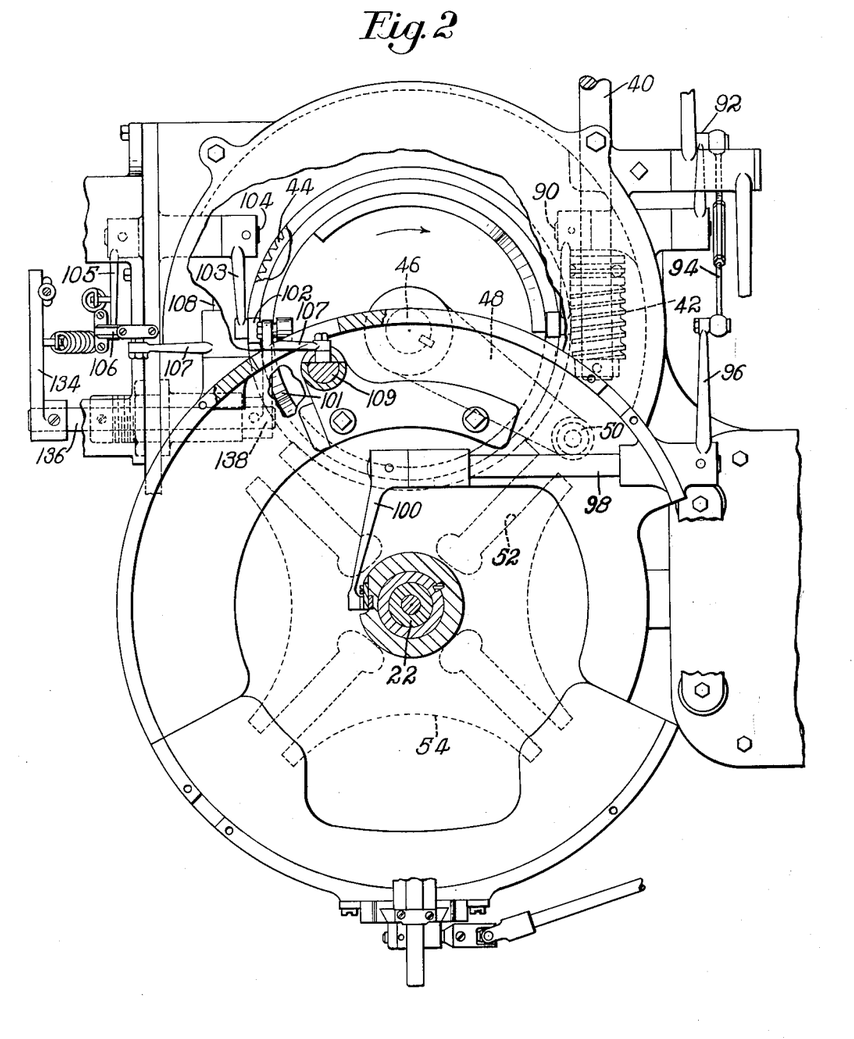
FIG. 2 is a somewhat fragmentary plan view of certain of the driving and control devices including the turret drive and the mechanism for transferring the shoe upper size adjustment to each of two operating stations of the machine.

Referring more particularly to the drawings, the base of my automatic machine for eyeletting and lacing shoe uppers is indicated at 20 in FIG. 1. Mounted on the base is an indexing work supporting turret comprising a vertically disposed rotatable shaft 22 (see FIG. 2) having mounted on its upper end an annular disk 24 (see FIGS. 1 and 3) which in turn carries four identical work holders 26 mounted on guideways 28 extending radially outwardly from the supporting disk 24 at 90° angles from one another. The general arrangement of the turret is best shown in the plan view FIG. 3, four stations being provided at equally spaced intervals about the periphery of the turret. At the front of the machine there is a locating station generally indicated at P for the assistance of the operator in locating and clamping successive uppers on the work holders. The remaining stations proceeding in a counterclockwise direction around the turret comprise an eyeletting station generally indicated at I, a lacing station generally indicated at L, and a fourth unloading or discharge station indicated at D at which in accordance with the present invention the successively processed uppers are unloaded from the turret and transferred to a stacking device hereinafter described.

Each individual work holder 26 comprises a slide on which is mounted a pair of clamping jaws including a relatively stationary underjaw 30 and a pivoted upper jaw 32 for supporting the upper between them. Each work holder is also provided with a pair of vamp spreaders 34, 36 which are arranged to be moved toward one another to position the outer portions of the upper or vamp to facilitate the moving of the work support and shoe upper held thereon outwardly into operating relation to each of the eyeletting and lacing mechanisms in turn.

The operation of the turret mechanism to index the turret, to effect the release of the vamp spreaders and clamping jaws of each work holder in turn as it approaches the fourth or unloading station, to latch the turret in each successive indexed position and to start the operation of each of the eyeletting and lacing mechanisms is effected through driving and control devices which include a continuously driven power shaft 40 (see FIG. 2) which has mounted thereon a worm 42 for engagement with a worm gear 44 on a vertically disposed shaft 46 continuously driven thereby. At its upper end the drive shaft 46 carries a short Geneva driving arm 48 having a follower roll 50 which is adapted to engage successively in the slots 52 of a star wheel 54 on the supporting shaft 22 of the turret assembly. Each full revolution of the shaft 46 and the Geneva driving arm 48 acting through the star wheel 54 produces a single 90° indexing movement of the turret mechanism by means of which each of the work holders is moved to the next succeeding station, being moved in successive steps from the loading station to the eyeletting station, to the lacing station and thence to the discharge station of the machine.

The upper clamping jaw 32 is held in work clamping position during the transfer of the work holder to each of the eyeletting and lacing stations of the machine and is released at the third discharge station by means of a toggle arrangement generally indicated at 60 in FIG. 1.

The toggle 60 associated with the work holder located at the loading station of the machine is straightened to clamp the shoe upper when the machine is started by means of a foot treadle 62 which acts through a vertically disposed control rod 64 and an actuating lug 66 which engages an actuating strap 78 which forms part of the work clamp toggle mechanism to move the toggle to its straightened position. A toggle connection of the kind above referred to for moving the upper clamping jaw to its clamping position is fully illustrated and described in the Patent No. 2,461,889 above referred to.

The vamp spreaders 34, 36 as shown in FIG. 1, are mounted to turn about a horizontal pivot 70 on the work support 26 and are controlled by means of a toggle connection generally indicated at 72 which acts when straightened to hold the vamp spreaders in their clamping position. The vamp spreaders are moved to the clamping position by the operator when the upper has been properly positioned on the work support, this action being utilized to operate a starting switch to start the machine in operation. The construction and arrangement of the vamp spreaders and their operating toggle connections are similar to those illustrated and described in the Patent No. 2,872,691 above referred to.

Figure 3:
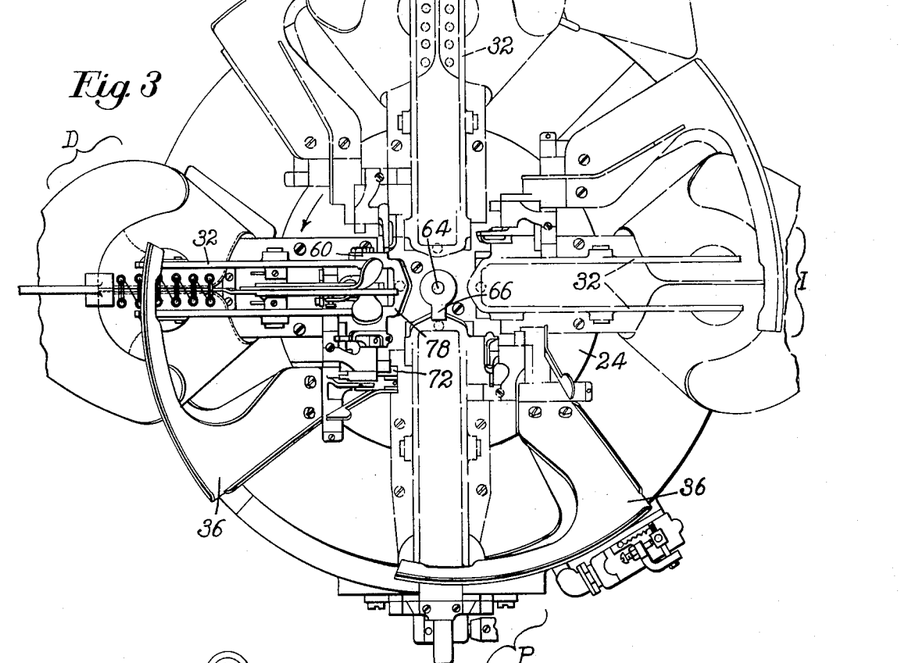
FIG. 3 is a fragmentary plan view of the automatic machine for operating upon a shoe upper illustrating particularly the work supporting and transfer assembly of the machine including the turret and four work holders.
Figure 4:
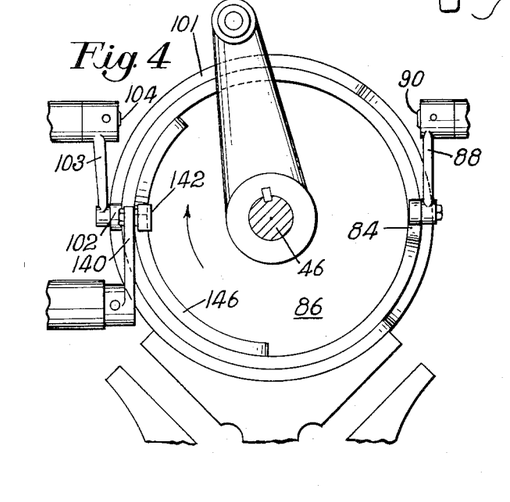
FIG. 4 is a detailed sectional plan view of the vertically arranged cam shaft for the turret carried in the machine base, illustrating particularly the crank arm associated with the star wheel by means of which the machine turret is given a stepped rotation, the cam and follower connection for locking the turret in each successive indexed position, the cam and follower connection for effecting the upper clamp toggle release, and the cam and follower connection for actuating my novel upper unloading mechanism.
Figures 5, 6:
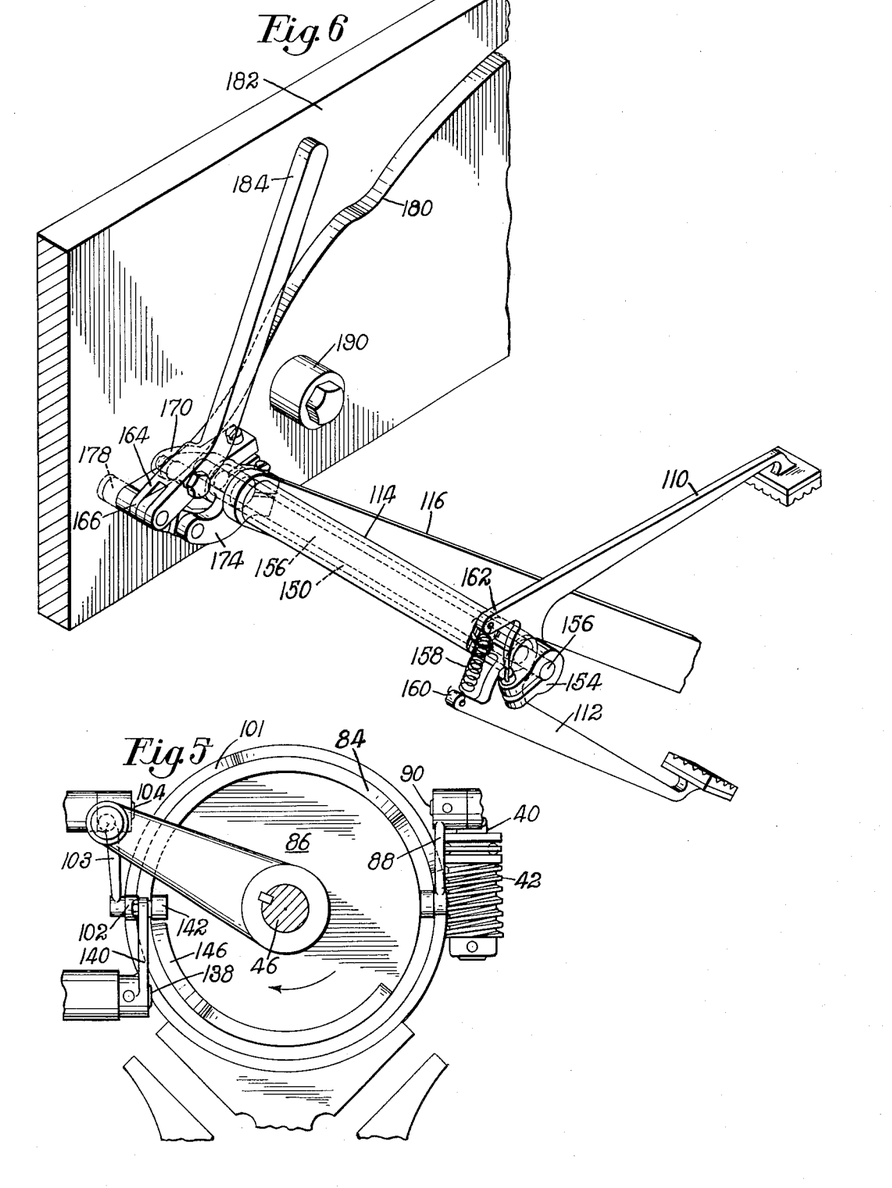
FIG. 5 is a view similar to FIG. 4 illustrating another angular position of the cam shaft and star wheel and of the several operating cams above set forth.
FIG. 6 is a detailed isometric view illustrating the gripper mechanism by means of which the upper is gripped and removed from the machine and is thereafter released onto a stack of processed uppers, the gripper being shown in its fully retracted or released position.
Figures 7, 8:
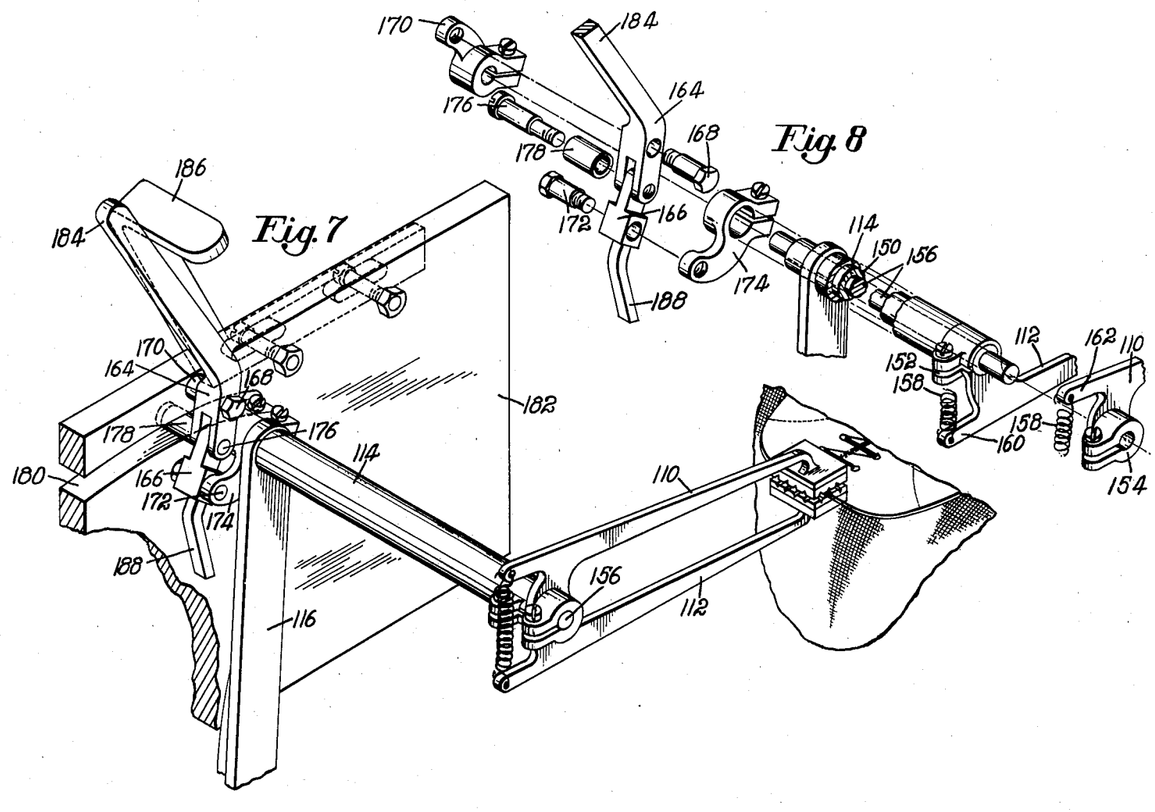
FIG. 7 is a perspective view of the gripper mechanism shown in FIG. 6 but with the jaws shown in gripping position preparatory for removal from the machine.
FIG. 8 is an exploded perspective view illustrating the parts of the gripper supporting and rocking mechanism shown in FIG. 7.

The work clamping jaw 32 and the vamp spreaders 34, 36 associated with the work support which is being transferred from the lacing station to the discharge station are released simultaneously by the continued rotation of the cam shaft 46 through a complete revolution following the indexing movement which transfers the work support with the eyeletted and the laced upper held thereon to the discharge station at the left side of the machine as indicated in FIG. 3. Clamp release plungers 76 are provided, one for each work support, journaled to slide in vertical drills in the turret beneath actuating straps 78 which form part of the work clamp toggle mechanism so that upward movement of any one of the plungers will cause the head thereof to engage and move the cooperating strap 78 upwardly to break the toggle connection, and thereby to release the clamping jaw toggle from its straightened clamping position. With this upward movement the strap 78 acts through connections, not specifically shown, to similarly break the vamp spreader toggle connection associated with the same work holder so that both the work clamping jaw 32 and the vamp spreaders 34, 36 are moved to the open release position indicated in FIG. 1. Following each indexing movement of the turret and just before the cam shaft 46 has reached the position indicated in FIG. 4, the plunger 76 associated with the work holder which has been moved to the position at the left of the loading station is moved upwardly into engagement with the strap 78 to release the work clamping jaw 32 and vamp spreaders 34, 36 by the action of a slide 80 supported for vertical movement in a relatively stationary guideway formed in a fixed sleeve member 82. The connections for raising the slide 80 and the contacting plunger 76 therewith (see FIGS. 1 and 2) comprise a face cam 84 (see FIGS. 4 and 5) formed on a cam plate 86 on the drive shaft 46 of the Geneva motion, and a cam follower lever 88 secured to a rock shaft 90. Another arm 92 (FIG. 2) secured to the rock shaft 90 is connected by a link 94 with a lever arm 96 secured to a rock shaft 98 to which is also secured an actuating arm 100 having a roll for engagement with a transverse slot in the slide 80.

Figure 9:
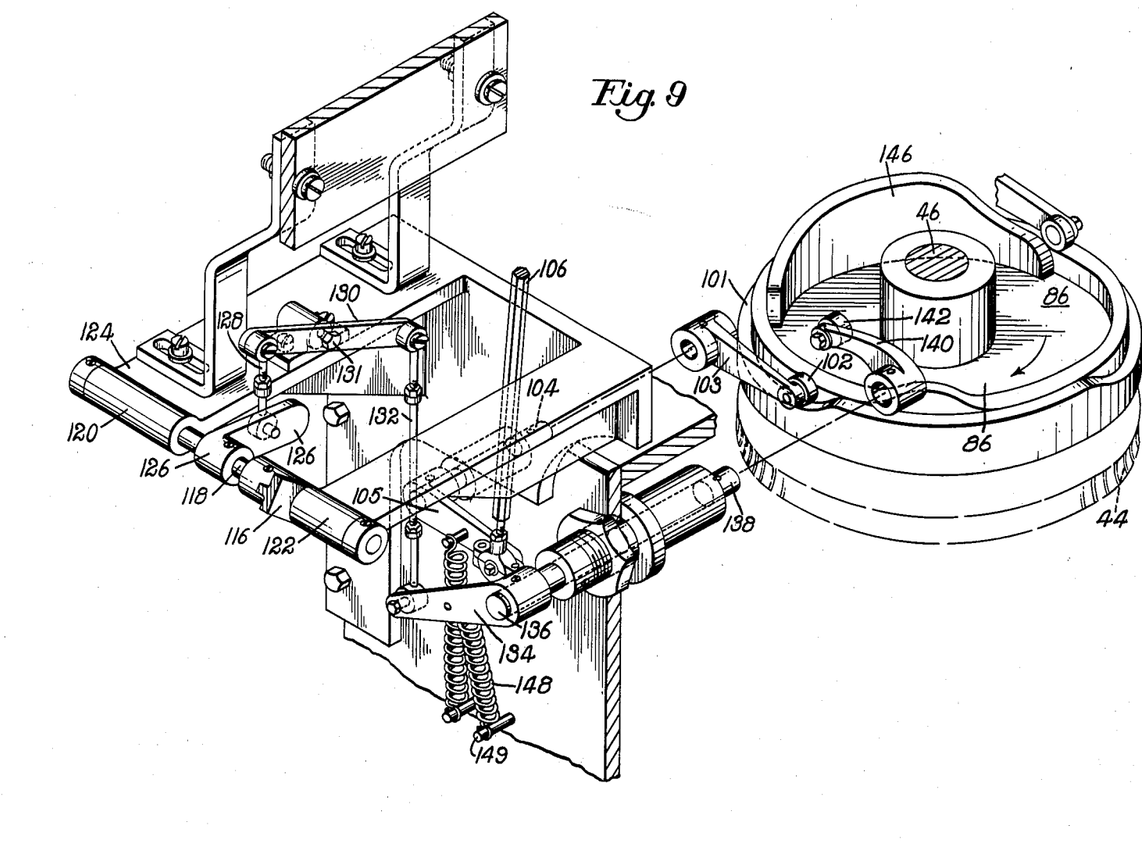
FIG. 9 is an isometric view of the cam and follower connections for moving the gripper in a forward and back direction.

As set forth in the prior Fossa Patent No. 2,461,889 above referred to, mechanism is set in motion upon the completion of each indexing movement of the turret to lock the turret in its indexed position, to raise the locating devices for positioning a new upper at the loading station, and to start the eyeletting and lacing mechanisms of the machine. These functions are all controlled by means of a face cam 101 on the cam plate 86 which is engaged by a follower roll 102 on a cam follower lever 103 secured to a rock shaft 104. A second arm 105 (see FIGS. 2 and 9) pinned to the rock shaft 104 is connected by an upwardly extending link 106 to one arm of a lever 107 secured to a rearwardly extending rock shaft 108. The other arm of the lever 107 engages a vertical extending detent plunger 109 which for each indexed position of the turret is arranged to engage in a recess (not shown) formed in the under side of the turret. Inasmuch as these parts are fully set forth and shown in the patent to Fossa 2,461,889 above referred to and form specifically no part of the present invention, no further illustration or description thereof is believed necessary.

The automatic upper unloading and stacking device which forms more particularly the subject matter of the present invention as shown specifically in the embodiment of FIGS. 1–10 inclusive comprises a grab mechanism which takes the form of a pair of grippers 110, 112 rotatably supported by means of a sleeve hub 114 on the upper end of a gripper carrying and actuating arm 116. At its lower end the carrying arm 116 is secured to a rock shaft 118 rotatably mounted in sleeve bearings 120, 122 formed in a fixed bracket 124. The gripper carrier arm 116 is moved inwardly toward the machine to cause the grippers to engage an eyeletted and laced upper and is moved outwardly from the machine to cause the grippers to remove an eyeletted and laced upper from the work support and thereafter to deposit said upper on a stacking device through connections which are timed from the vertically disposed cam shaft 46. A rearwardly extending arm 126 secured to the rock shaft 118 is connected by a link 128 with one end of a lever 130 pivoted at 131 to the bracket 124. At its rear end the lever 130 is connected by means of a link 132 with an arm 134 secured to a rock shaft 136. A rearward extension 138 of the shaft 136 has secured thereto a cam follower lever 140, having a follower roller 142 which is adapted for engagement with a face cam 146 on the cam plate 86. A tension spring 148 connected between the arm 134 and pin 149 on the machine base acts to bias the follower roll 142 downwardly against its cam 146. The gripper members 110, 112 are moved positively to the advanced gripping position of FIG. 7 by the action of cam 146, and are moved yieldably to the withdrawn position of FIGS. 6 and 10 by the spring 148.

The gripper members 110, 112 are pivotally mounted on the supporting lever for relative opening and closing movements which are effected by the bodily movement of the gripper assembly on its supporting lever 116 with relation to certain fixed cam surfaces. As best shown in the exploded view FIG. 8, the lower gripper member 112 is clamped by means of a split clamp 152 to a sleeve 150 which is rotatably supported within the sleeve hub 114. The upper gripper member 110 is secured by means of a split clamp 154 to a shaft 156 which is rotatably supported within the sleeve 150 and outer sleeve hub 114. A tension spring 158 connected between a tail 160 of the lower gripper member 112 and a tail 162 of the upper gripper member 110 tends normally to relatively swing these gripper members to their open position as shown, for example, in FIG. 6. The gripper members 110, 112 are moved between gripping and open positions by means of a toggle mechanism which comprises an upper toggle arm 164 which is pivotally connected by a pin 168 with an upwardly extending curved arm 170 secured by a split clamp to the inner shaft 156 supporting the upper gripper member 110. A lower toggle member 166 is pivotally connected by pin 172 to a downwardly extending curved arm 174 which is secured by split clamp to turn with the sleeve 150 and lower gripper member 112. The two toggle links 164, 166 are connected to one another by means of a pin 176 which carries a roller 178 for engagement in a stationary cam slot 180 formed in the face of a vertically disposed cam plate 182. It will be noted that the upper toggle member 164 is provided with an unwardly extending arm 184 which is arranged for the fully advanced position of the gripper supporting lever 116 and gripper assembly to be engaged by a stationary member 186 which has the effect of moving the toggle to its straightened position in which the grippers are brought into gripping engagement with the eyeletted and laced upper at the discharge station of the machine. The lower toggle member 166 is provided with a downwardly extending arm 188 which is arranged for engagement with a cylindrical abutment 190 formed on the face of the cam plate 182. During the outward movement of the gripper supporting lever 116 and gripper assembly to its retracted upper discharge position, the arm 188 engages the abutment 190 causing the toggle to be broken and the grippers to move apart under the influence of spring 158 to the separated position of FIG. 6.

Figure 10:
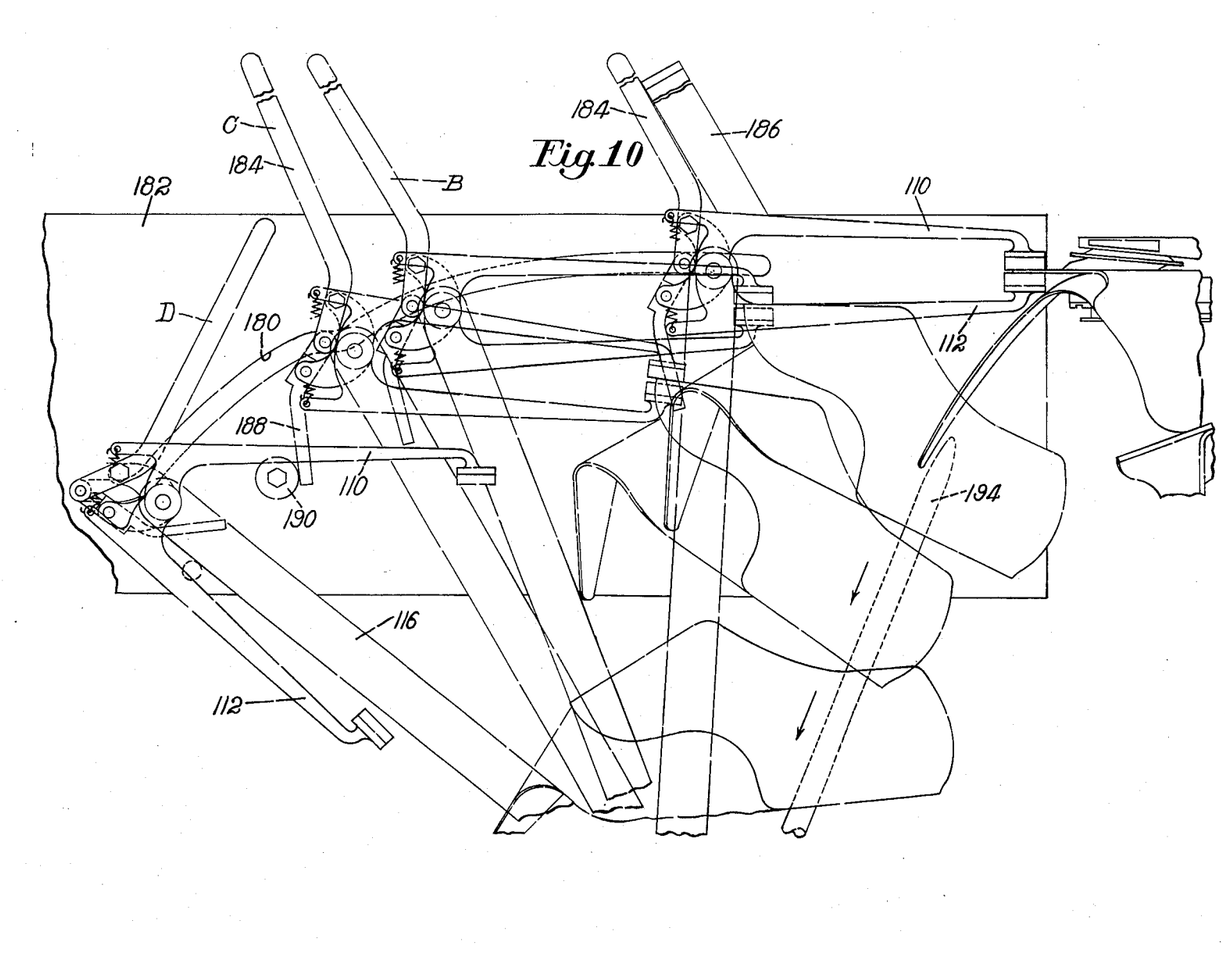
FIG. 10 is a diagrammatic view illustrating four successive positions of the gripper between the fully advanced upper engaging position and a fully retracted open upper discharge position.

The follower roller 178, mounted coaxially with the pivot pin 176 connecting the two toggle arms 164, 166 as indicated, for example, in the several positions of the gripper mechanism shown in FIG. 10, is at all times located leftwardly and outwardly of the rotational axis of the gripper arms 110, 112 on the sleeve hub 114. As the gripper carrier arm 116 is moved leftwardly and outwardly from the extreme position to the right shown in FIG. 10 in which the grippers are engaged with an eyeletted and laced shoe upper, the slot 180 curves gradually away from the pivot for the gripper support lever 116 provided by rock shaft 118, causing the gripper members to swing slightly downwardly as a unit to the position designated at B in FIG. 10. Upon continued movement of the gripper mechanism to the left, the follower roller 178 rides upwardly in an upwardly angled portion of the groove 180 at substantially the position C of FIG. 10 so that the closed gripper members are moved sharply in a downward direction to draw the completed upper downwardly onto a stacking spindle 194. At this point the downwardly extending arm 188 of the lower toggle member 166 engages the cylindrical abutment 190 to break the toggle and thus to cause the gripper arms 110, 112 to move to the open position. Continued movement of the gripper assembly to the fully retracted discharge position designated at D in FIG. 10 causes the follower roller 178 to ride outwardly in an out-turned end portion of the slot 180 thus tipping the open gripper members downwardly to insure the release of the upper from the gripper.

The stacking spindle 194, as best shown in FIG. 1, comprises a rod tapered slightly at its upper end to receive the upper and bent at its lower or base end so that it slants downwardly away from the machine. The spindle is mounted in a socket 196 forming part of a stand 198 having an outwardly sloping surface 200 to receive thereon the pile of uppers as they are stacked on the spindle 194.

When the machine is started, as more fully set forth in the Fossa Patent No. 2,461,889 above referred to, a newly positioned upper is clamped in position by the operation of the foot treadle 62, and the vamp spreaders 34, 36 are moved into clamping position starting the machine in operation. The cam shaft 46 and cam plate 86 are rotated through one full revolution from the position shown in FIGS. 2 and 9 in a clockwise direction as indicated by the arrow. The turret is indexed through a quarter turn by the operation of the Geneva motion arm 48. Cam follower lever 103 and follower 102 are engaged by the cam 101 to withdraw and thereafter to reengage the detent 109 to lock the turret in its newly indexed position, and to start in operation each of the eyeletting and lacing mechanisms of the machine. When the cam shaft 46 has moved through approximately one-half revolution, the cam follower lever 140 which controls the upper unloading and stacking device is brought into active engagement with its cam 146 to advance the gripper members 110, 112. Also at the same time and while the grippers are being advanced by the movement of cam lever 140 and roller 142 upwardly on the rise portion of cam 146, the cam follower lever 188 engages a short rise portion of its cam 84 so that the clamp toggle release mechanism is tripped to release the clamping jaw 32 and vamp spreaders 34, 36 associated with the work holder now located at the discharge station. This is substantially the position of the cam shaft 46 and face cam plate 86 shown in FIG. 4. During continued rotation of the cam shaft 46 to its starting position of FIG. 2, follower lever 140 will have completed its movement controlled by cam 146 to grip the eyeletted and laced upper at the discharge station and to withdraw it onto the stacking spindle as above set forth.

FIGS. 11–14 inclusive of the drawings illustrate an alternative embodiment of the invention in which the grab mechanism comprises a pair of hooks 204, 206 which are mounted on the carrier arm 116 in place of the gripper members 110, 112 and the mechanism above described for moving the gripper members between open and gripping positions. The hooks 204, 206 are rigidly mounted on a hub 208, which is secured to a rock shaft 210 rotatably supported within the sleeve 114 hub of the carrier arm 116. At its opposite end the rock shaft 210 carries a block 212 on which is mounted a downwardly extending stop plate 214 supporting an adjustable stop screw 216 which is arranged to engage against one face of the carrier arm 116. The weight of the hooks 204, 206 is sufficient to rock the hook assembly in a clockwise direction as viewed, for example, in FIG. 12 to a position in which the stop screw 216 is engaged with the carrier arm 116.

Figures 11, 12, 13, 14:
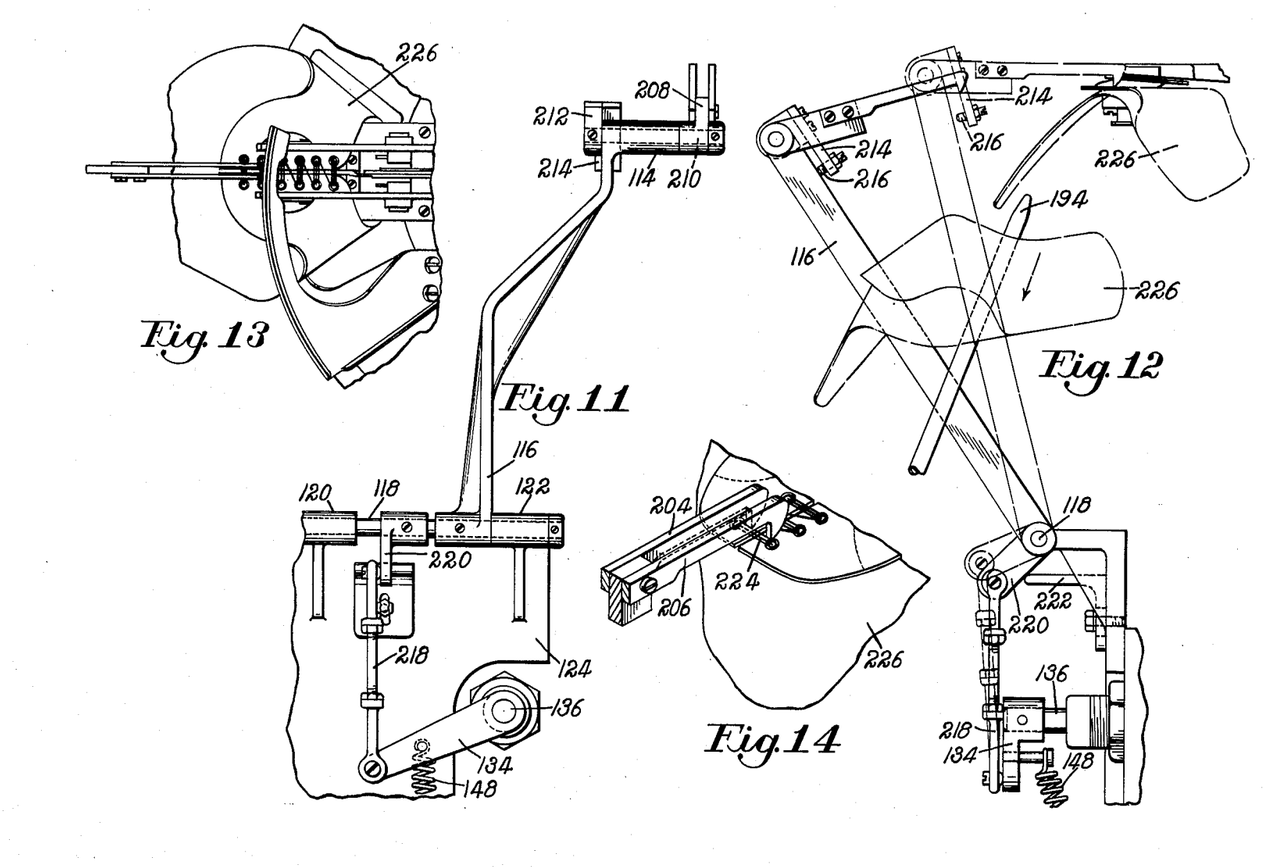
FIG. 11 is a detailed view in elevation of the hook member supporting rocker arm and certain of the supporting and actuating connections therefor.
FIG. 12 is a view in side elevation of the hook supporting assembly including the rocker arm of FIG. 11; the parts being shown in solid lines in a withdrawn position and with dot-and-dash lines in an advanced position in which the hook member engages the eyeletted and laced upper.
FIGS. 13 and 14 are respectively a plan view and a perspective view of the hook member engaging the shoe upper.

Forward and back movements are imparted to the carrier arm 116 between the advanced upper engaging position shown in dot-and-dash lines in FIG. 12 and a retracted upper discharge position by means of connections which are operated by the upper unloading and stacking device, actuating cam 146 and cam lever 140, and which include the shaft 136, its extension 138, the lever arm 134 and spring 148. In the embodiment of the invention specifically shown in FIGS. 11 and 12, the lever arm 134 is connected by means of a link 218 with an outwardly extending lever 220 secured to the rock shaft 118. With this arrangement the spring 148 acting through lever arm 134, link 218 and arm 220 tends to move the carrier arm 116 and hooks 204, 206 outwardly to the withdrawn upper discharge position shown in full lines in FIG. 12, in which the lever 220 engages against a stop plate 222. The carrier arm 116 and hooks 204, 206 are moved positively to the advanced upper engaging position by engagement of the cam 146 with the follower roll 142 and cam lever 140.

The operation of the hooks to engage and to withdraw a completed upper from the machine at the discharge station, and for depositing each such upper in succession on the stacking spindle 194 will be described briefly as follows: The carrier arm 116 is advanced from the retracted position shown in full lines in FIG. 12 to the advanced upper engaging position, and is thereafter returned to the retracted position in timed relation to the machine operation by the engagement of the cam follower lever 140 with the face cam 146, as above set forth. The stop screw 216, above referred to, is adjusted so that during the forward movement of the carrier arm the cammed outer edge of the hooks 204, 206 will ride over and catch behind the first lace 224 of the eyeletted and laced shoe upper designated at 226 in FIGS. 13 and 14 of the drawings at the discharge station D of the machine. As the carrier arm 116 is now moved outwardly away from the machine, the hooks 204, 206 will drag the completed upper away from the work support onto the upper end of the work receiving spindle 194 where it is permitted to fall onto the stack of uppers being built up on the sloping surface 200.

The invention having been described what is claimed is:

1. In a machine for operating upon shoe uppers having a work support shiftable between an operating station and a discharge station, clamping devices for clamping and releasing an upper supported on said work support, and operating means for the machine including cam and follower devices actuated by the machine for shifting said work support to the discharge station and for unclamping the upper supported on the work support at said discharge station, the combination of a device for removing a shoe upper from said work support located at said discharge station which comprises a grab operable to engage and to draw from the work support an upper supported on the work support at said discharge station, and a cam and follower device actuated by the machine for operating said grab to remove the unclamped upper from the work support.

2. In a machine for operating upon shoe uppers having a work support shiftable between an operating station and a discharge station, the combination of operating means including means for shifting the work support from the operating station to the discharge station, a device for removing a shoe upper from said work support located at said discharge station which comprises a grab operable to engage an upper on the work support at said discharge station, and means controlled by said operating means upon movement of the work support to said discharge station for moving said grab to engage and withdraw said shoe upper from the work support.

3. In a machine for operating upon shoe uppers having a work support shiftable between an operating station and a discharge station, the combination of a grab for removing a shoe upper from said work support located at said discharge station, which comprises a pair of gripper members, a carrier arm providing a pivotal support on which said gripper members are relatively movable into and out of gripping position, a stationary pivot on which said carrier arm and gripper members supported thereby are movable toward and away from the work support at said discharge station, means actuated by said movement of said carrier arm to a position toward the work support to engage the gripper members and by said movement of the carrier arm to a position away from the work support to open said gripper members, and means acting when rendered operative for moving said carrier arm from one to the other of said positions toward and away from the work support.

4. In a machine for operating upon shoe uppers having a work support shiftable between an operating station and a discharge station, the combination of a storage device to receive discharged uppers, and a grab comprising a pair of gripper members operable to grip a shoe upper supported by said work support at said discharge station, means for moving said grab between an advanced gripping position and a retracted discharge position, means operative during the advancing movement of said grab to cause the gripper members to grip the shoe upper supported by the work support, and means operative during the retracting movement of the grab to withdraw the gripped upper from the work support and thereafter to release said upper from the gripper members onto said storage device.

5. In a machine for operating upon shoe uppers having a rotatable turret, a series of work supports mounted at spaced intervals about said turret to be presented in succession to a series of loading, operating, and discharge stations arranged at said spaced intervals about the turret, the combination of a storage device to receive discharged uppers, and a grab comprising gripper members relatively movable between a closed gripping position and a separated discharge position, means for moving said grab between an advanced gripping position at said discharge station and a retracted discharge position, means controlled by the advancing movement of said grab to engage the gripper members with a shoe upper held on the work support at said discharge station and by a withdrawing movement of said grab to separate said gripper members and thereby to release said upper from the grab into said storage device, and driving means comprising a cam shaft having a rotational movement, means actuated by said rotational movement of the cam shaft for imparting an indexing movement to the turret and thereafter for advancing and retracting the grab to cause the gripper members to grip and to withdraw a shoe upper from the work support at said discharge station, and thereafter to release said upper from the gripper members into said storage device.

6. In a machine for operating upon shoe uppers having a work support on which the operated upon upper is supported, the combination of an upper unloading device which comprises a pair of gripper members relatively movable between a closed gripping position and a separated discharge position, means moving said gripper members between a withdrawn upper discharge position and an advanced position for gripping an upper supported on said work support, and means controlled by the advance of said gripper members to engage said gripper members with an upper supported on said work support and by a withdrawing movement of said gripper members to separate said gripper members and thereby to discharge the upper from said gripper members.

7. In a machine for operating upon shoe uppers having a work support, and means for clamping and unclamping an upper to be worked upon on said work support, the combination of, an upper unloading device which comprises a pair of gripper members, a carrier on which said gripper members are relatively movable between a separated discharge position and a closed upper gripping position, means on the machine for moving the carrier and gripper members between a withdrawn discharge position and an advanced upper engaging position, means controlled by the advance of said carrier to engage said gripper members and by the retracting movement of the carrier to separate said gripper members, and means acting when rendered operative for unclamping a worked upon upper and for advancing and retracting said carrier.

8. In a machine for operating upon shoe uppers having a work support on which the operated upon upper is supported, the combination of an upper unloading device which comprises a pair of gripper members, a carrier on which said gripper members are pivoted to turn relatively to one another on a common axis between a separated upper discharge position and a closed upper gripping position, means supporting said carrier and gripper members on the machine for movement toward and away from the work support, and means controlled by said movement of the carrier and gripper members toward the work support to engage the gripper members with a supported upper and by said movement away from the work support to open said gripper members, said latter means comprising a pair of toggle members having a common pivot and connected one to each of said gripper members, a fixed guide cam on the machine engaging said common pivot, and abutments on the machine arranged to engage and straighten said toggle members during the advancing movement of the carrier and gripper members and thereby to move the gripper members into gripping engagement with an upper, and arranged to engage and break said toggle members during said movement of the carrier away from the work support to open said gripper members and thereby to discharge the engaged upper therefrom.

9. In a machine for operating upon shoe uppers having a work support on which the operated upon upper is held, the combination of an upper unloading and stacking device which comprises a stacking spindle spaced from the work support to receive uppers thereon, a pair of gripper members, a carrier on which said gripper members are pivoted to turn relatively to one another on a common axis between a separated upper discharge position and a closed upper gripping position, means supporting said carrier and gripper members on the machine for movement toward and away from the work support, a pair of toggle members having a common pivot and connected to one of each of said gripper members, a fixed guide cam on the machine engaging said common pivot, an abutment on the machine arranged to engage and to straighten said toggle members during the advancing movement of the carrier and gripper members and thereby to move the gripper members into gripping engagement with an upper, and a further abutment on the machine arranged to engage and break said toggle members during said movement of the carrier away from the work support, said guide cam being contoured to move the gripper members and upper engaged thereby away from the work support and then downwardly onto the stacking spindle.

10. In a machine for operating upon shoe uppers having a work support on which a laced shoe upper is supported in an opened-out position preparatory for discharge from said machine, the combination of an upper unloading device which comprises a grab consisting of a substantially horizontally extending shank portion and a downwardly projecting hook portion, a carrier on which said hook is movable over and into hooking engagement with a lacing of said supported upper, and means for moving said carrier and grab between an advanced position in which the hook is engaged with said lacing and a retracted discharge position in which the laced upper is withdrawn from the work support and discharged from said hook.

11. In a machine for operating upon shoe uppers having a work support on which a laced shoe upper is supported in an opened-out position preparatory for discharge from said machine, the combination of an upper unloading and stacking device which comprises a grab consisting of a substantially horizontal extending shank portion and a downwardly projecting hook portion, a pivoted carrier arm on which said hook is yieldably supported for movement over and into hooking engagement with a lacing of said upper, a stacking spindle displaced from said work support on the machine to receive thereon uppers withdrawn from the work support by said grab, and means for pivotally moving said carrier arm and grab between an advanced position in which the hook is engaged with said lacing and a retracted discharge position in which the laced upper is withdrawn from the work support and discharged onto said stacking spindle.

No references cited.